United States Patent
Khatri et al.

(10) Patent No.: US 7,783,872 B2
(45) Date of Patent: Aug. 24, 2010

(54) SYSTEM AND METHOD TO ENABLE AN EVENT TIMER IN A MULTIPLE EVENT TIMER OPERATING ENVIRONMENT

(75) Inventors: Mukund P. Khatri, Austin, TX (US); Anil V. Rao, Cedar Park, TX (US)

(73) Assignee: Dell Products, LP, Round Rock, TX (US)

(*) Notice: Subject to any disclaimer, the term of this patent is extended or adjusted under 35 U.S.C. 154(b) by 739 days.

(21) Appl. No.: 11/693,873

(22) Filed: Mar. 30, 2007

(65) Prior Publication Data
US 2008/0244302 A1 Oct. 2, 2008

(51) Int. Cl.
*G06F 15/177* (2006.01)
(52) U.S. Cl. .......................................... 713/1
(58) Field of Classification Search ............... 713/1, 713/2
See application file for complete search history.

(56) References Cited

U.S. PATENT DOCUMENTS

| | | | |
|---|---|---|---|
| 4,538,273 A | 8/1985 | Lasser | |
| 4,566,111 A | 1/1986 | Tanagawa | |
| 4,586,179 A | 4/1986 | Sirazi et al. | |
| 4,594,685 A | 6/1986 | Owens | |
| 4,627,060 A | 12/1986 | Huang et al. | |
| 4,763,296 A | 8/1988 | Gercekci | |
| 4,796,211 A | 1/1989 | Yokouchi et al. | |
| 4,809,280 A | 2/1989 | Shonaka | |
| 4,879,647 A | 11/1989 | Yazawa | |
| 4,956,807 A | 9/1990 | Hosaka et al. | |
| 4,956,842 A | 9/1990 | Said | |
| 5,048,017 A | 9/1991 | Breneman | |
| 5,155,846 A | 10/1992 | Mino | |
| 5,157,699 A | 10/1992 | Miyazaki et al. | |
| 5,175,845 A | 12/1992 | Little | |
| 5,233,613 A | 8/1993 | Allen et al. | |
| 5,398,332 A | 3/1995 | Komoda et al. | |
| 5,404,356 A | 4/1995 | Abe | |
| 5,408,643 A | 4/1995 | Katayose | |
| 5,450,576 A | 9/1995 | Kennedy | |
| 5,513,319 A | 4/1996 | Finch et al. | |
| 5,541,943 A | 7/1996 | Niescier et al. | |
| 5,574,895 A * | 11/1996 | Lee et al. ................. 713/500 |
| 5,594,865 A | 1/1997 | Saitoh | |
| 5,864,663 A | 1/1999 | Stolan | |
| 5,906,315 A | 5/1999 | Lewis et al. | |
| 5,919,212 A | 7/1999 | Olson et al. | |
| 5,983,330 A | 11/1999 | Miwa et al. | |
| 6,112,320 A | 8/2000 | Dien | |

(Continued)

*Primary Examiner*—Chun Cao
(74) *Attorney, Agent, or Firm*—Larson Newman & Abel, LLP

(57) ABSTRACT

An information handling system including a local event timer operably associated with a management application interface is disclosed. The information handling system can also include a remote event timer accessible by a system management application. The remote event timer can be used relative to use of the local event timer. The information handling system can also include an event timer detection module operable to determine an availability of the local event timer relative to an operating system type. The event timer detection module can also initiate use of the local event timer, and disable use of the remote event timer in response to detecting a local event timer enabled operating system. A method and a chipset configured to be used by an information handling system are also disclosed.

20 Claims, 3 Drawing Sheets

U.S. PATENT DOCUMENTS

| | | |
|---|---|---|
| 6,145,103 A | 11/2000 | Typaldos et al. |
| 6,243,837 B1 | 6/2001 | Zimmermann et al. |
| 6,260,162 B1 | 7/2001 | Typaldos et al. |
| 6,307,480 B1 | 10/2001 | Sheldon et al. |
| 6,385,274 B1 | 5/2002 | Nohara |
| 6,393,589 B1 | 5/2002 | Smit et al. |
| 6,523,126 B1 | 2/2003 | Brabenac |
| 6,604,001 B2 | 8/2003 | Thomas et al. |
| 6,819,011 B2 | 11/2004 | Kernahan et al. |
| 6,892,332 B1 | 5/2005 | Gulick |
| 6,946,753 B2 | 9/2005 | Kernahan et al. |
| 6,948,103 B2 | 9/2005 | Indo |
| 6,959,404 B2 | 10/2005 | Hirakawa et al. |
| 6,961,866 B2 | 11/2005 | Janin et al. |
| 7,000,100 B2 | 2/2006 | Lacombe et al. |
| 7,003,775 B2 * | 2/2006 | Lacombe et al. ............ 719/313 |
| 7,039,918 B2 * | 5/2006 | Jones et al. ................. 719/310 |
| 7,051,332 B2 | 5/2006 | Gatto et al. |
| 2002/0188836 A1 * | 12/2002 | Gurumoorthy et al. ......... 713/1 |
| 2006/0288197 A1 * | 12/2006 | Swanson et al. ............... 713/1 |
| 2007/0047195 A1 * | 3/2007 | Merkin et al. ............... 361/685 |
| 2008/0140895 A1 * | 6/2008 | Baker et al. ................ 710/262 |

* cited by examiner

SYSTEM AND METHOD TO ENABLE AN EVENT TIMER IN A MULTIPLE EVENT TIMER OPERATING ENVIRONMENT

FIELD OF THE DISCLOSURE

This disclosure relates generally to information handling systems, and more particularly to systems and methods to enable an event timer in a multiple event timer operating environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Under certain circumstances, such as a software error or a data corruption event, a processor of the information handling system can enter an error state, such as an infinite loop, from which the information handling system is unable to recover. As such, some information handling systems can incorporate a timer so that after a sufficient period of time has passed the processor may be reset, and the information handling system restored to normal operation.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
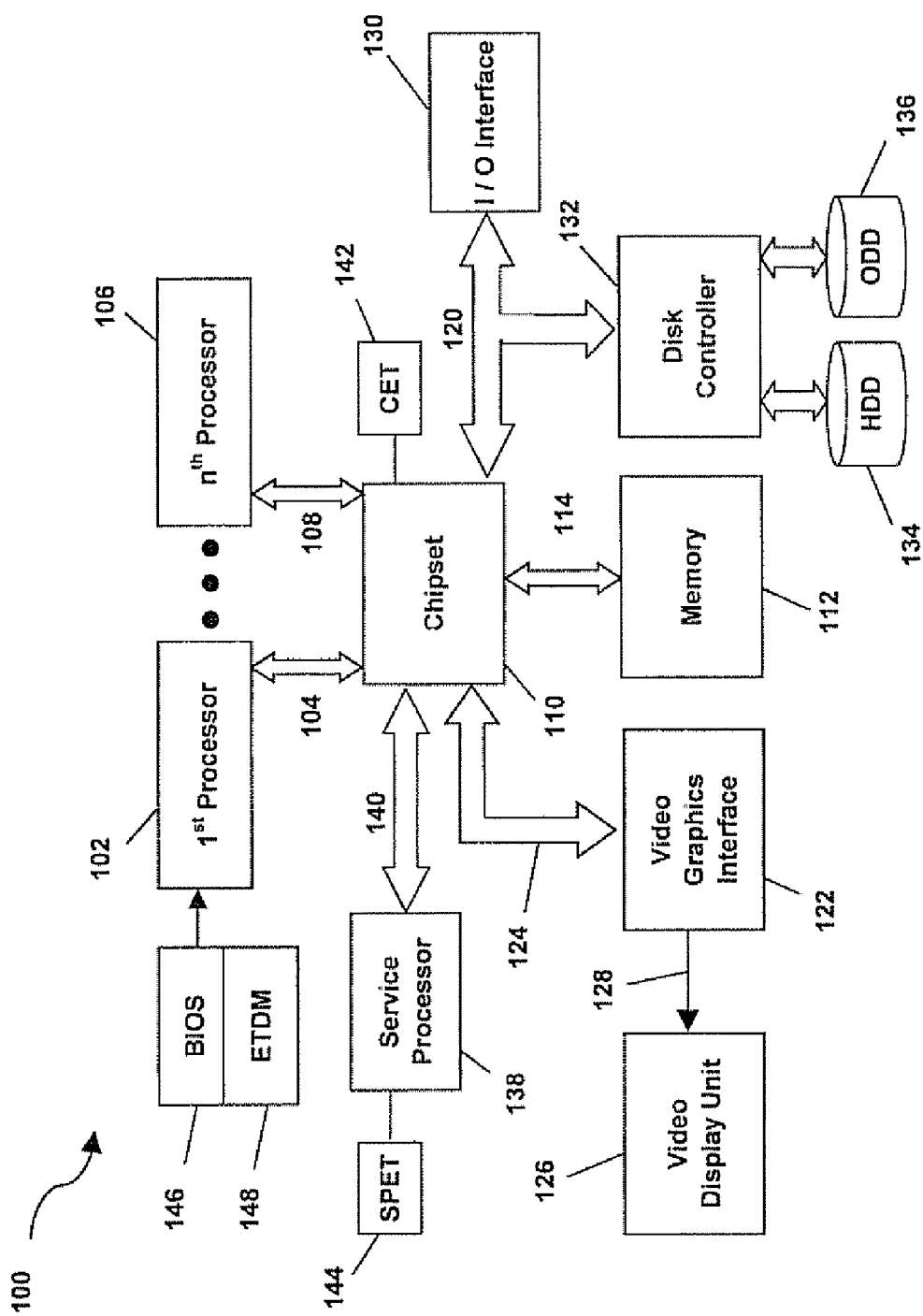
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

According to one aspect of the disclosure, an information handling system can include a local event timer operably associated with a management application interface is disclosed. The information handling system can also include a remote event timer accessible by a system management application. The remote event timer can be used relative to use of the local event timer. The information handling system can also include an event timer detection module operable to determine an availability of the local event timer relative to an operating system type. The event timer detection module can also initiate use of the local event timer, and disable use of the remote event timer in response to detecting a local event timer enabled operating system.

According to another aspect of the disclosure, a method of using an information handling system can include exposing a local event timer availability to an operating system using a configurations capabilities reference. The method can also include identifying an operating system type, and enabling use of a local event timer in response to determining the operating system type.

According to a further aspect of the disclosure, a chipset can be configured to be used by an information handling system to include a local event timer operable to detect an event and an application interface operable to enable access to the local event timer when the operating system type is compatible with the local event timer. The application interface can be further operable to initiate disabling a remote event timer.

According to one aspect, a local event timer can be considered a primary event timer and a remote event timer can be considered a secondary event timer. Each event timer can include a watchdog timer (WDT) that includes a hardware timing element that triggers the information handling system to reset if the hardware timing element is not periodically updated. For example, the WDT can include a counter that increments in response to a clock pulse. A main program, such as an operating system, periodically sends a reset instruction to the WDT, which causes the counter to be reset. If the main program fails to send the reset instruction, the counter reaches a threshold value and the WDT causes the system to reset. Additionally, the WDT can save debug information such as information useful for debugging the program that caused the fault. Such information would be recorded to a persistent medium such as a flash memory, a hard drive, or a nonvolatile random access memory (RAM) where it would be preserved through the reset of the information handling system. It may be desirable to reset the information handling system if the debug information is not successfully saved within a certain amount of time.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can include an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can provide at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to provide content to display within a video display unit 126. Other graphics interfaces may also be used. The video graphics interface 122 can provide a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connected to an I/O interface 130 and one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Further, the information handling system 100 can include a service processor 138. The service processor 138 can be connected to the chipset 110 through a service processor bus 140 such as control bus, an $I^2C$ bus, or other buses operable to connect to the service processor 138. The service processor 138 can operate independently from the processors 102, 106 and can monitor the operation of the information handling system 100. In one form, the service processor 138 can include a Baseboard Management Controller /Management Engine (BMC/ME) service processor that can be used in association with an IPMI/iAMT firmware application. The service processor 138 can further employ service processor agents, such as Open Manage Server Administration (OMSA) and Dell Remote Assistant Card (DRAC), to access and use the SPET 144 to output error recovery and alerts.

The service processor 138 can also notify a system administrator in a variety of ways that a component has failed, or an event has occurred, including outputting an audible alert, turning on a LED to indicate a fault condition, sending an email or page to indicate a fault condition, logging the fault condition, and identifying the specific fault condition when queried by the system administrator, or any combination thereof.

According to one aspect, the information handling system 100 can also include a local event timer, such as a chipset event timer (CET) 142 operably coupled and accessible to the chipset 110. The information handling system 100 can also include a remote event timer, such as a service processor event timer (SPET) 144 that can be accessed by the service processor 138 in association with operating the information handling system 100. In one form, the CET 142 can be a separate component from (i.e., not integrated with), and connected to, the chipset 110. In an alternate embodiment, the CET 142 can be integrated into the chipset 110. In one embodiment, the CET 142 can be considered a chipset WDT. In another embodiment, the SPET 144 can be a separate component from (i.e., not integrated with), and connected to, the service processor 138. In an alternate embodiment, the SPET 144 can be integrated into the service processor 138. In one embodiment, the SPET 144 can be considered a native WDT.

In one form, the information handling system 100 can include a basic input output system (BIOS) 146 stored within a read only memory (ROM) and accessible by the information handling system 100 during initialization. The BIOS 146 can include an event timer detection module 148 operable to detect if one or more event timers or WDTs are available for use by the information handling system 100 during operation. In one form, the event timer detection module 148 can be a part of the BIOS 146 or may be stored within a separate storage location that can be accessed by the BIOS 146 during an initialization of the information handling system 100.

According to one aspect, during initialization of the information handling system 100, the event timer detection module 146 can detect if one or more event timer is available to be used by the information handling system 100. For example, the event timer detection module 146 can detect an availability of multiple event timers and can alter a setup option during initialization to employ a specific event timer. In one form, the BIOS 146 can determine a type of operating system to be loaded by the information handling system 100 and, based on the type of operating system, initiate use of a local or remote event timer. For example, if an operating system, such as Windows Vista or Windows Longhorn Server, can exploit use of the CET 142, access to a remote event timer, such as the SPET 144 can be disabled or reduced. However, if an operating system, such as Windows XP or Windows 2000, cannot make use of the CET 142, the SPET 144 associated with the service processor 138 can be enabled for use by the information handling system 100, and events can be monitored using the SPET 144 and the service processor 138 in association with the operating system loaded. In this manner, a multiple event timer operating environment can be employed independent of a specific type of operating system being used to monitor events.

According to one aspect, an operating system that can enable and use the chipset WDT 142 can employ a watchdog action table (WDAT), set up by a BIOS, that can be used with the operating system. The WDAT can include information about the chipset WDT 142, such as a minimum and a maximum counter value and a set of instructions to operate the chipset WDT 142.

In one form, the information handling system 100 can also employ an advanced configuration and power interface (ACPI). ACPI is an industry specification for the efficient handling of power consumption and configuration usage within information handling systems. ACPI can specify how a BIOS, operating system (OS), peripheral devices, or any combination thereof, can communicate with each other about power usage. According to one aspect, ACPI components collect information about power consumption of the information handling system 100 and can provide the collected information to the operating system. The operating system can then alter power distribution to different components on an as-needed basis.

Figure 2:
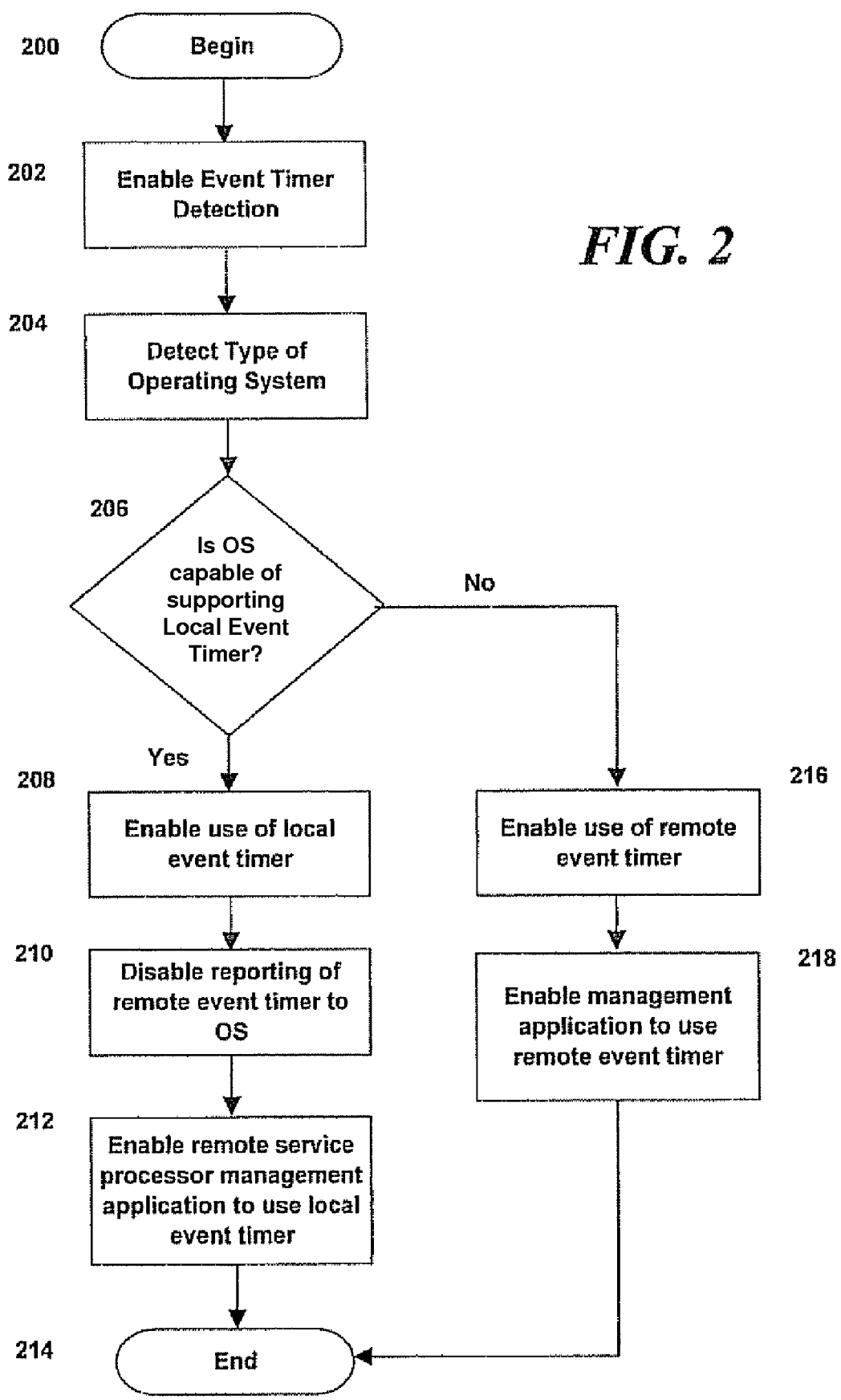
FIG. 2 illustrates a method of enabling an event timer in a multiple event timer operating environment in accordance with one aspect of the disclosure.

FIG. 2 illustrates a method of enabling an event timer in a multiple event timer operating environment in accordance with one aspect of the disclosure. The method of FIG. 2 can be employed in whole, or in part, by the information handling system 100 depicted in FIG. 1, or any other type of system, controller, device, module, application module, or any combination thereof, operable to employ all, or portions of, the method of FIG. 2. Additionally, the method can be embodied in various types of encoded logic including software, firmware, hardware, or other forms of digital storage mediums, computer readable mediums, or logic, or any combination thereof, operable to provide all, or portions, of the method of FIG. 2.

The method begins generally at block 200. At block 202, event timer detection can be enabled to detect if one or more event timers may be available to an operating system. For example, a BIOS or other initialization application can detect if one or more event timers, such as a WDT, may be available to be used by an operating system. Upon detecting that more than one event timer may be available, the method can proceed to block 204 and determines a type of operating system to be loaded during initialization of an information handling system. For example, an operating system such as Windows Vista, Windows Longhorn Server, or other types of operating systems can be employed.

Upon detecting a type of operating system, the method can proceed to decision block 206 and determine if the operating system is compatible with the type of event timer detected. For example, if a local event timer, such as a chipset WDT may be detected as being available for use by an operating system. Additionally, a remote event timer, such as a service processor WDT or other native WDT operably associated with a systems management application or service processor can be detected. The operating system is then determined at 206, and if the operating system can employ the local event timer, the method can proceed to block 208 and enable use of the local event timer. For example, an ACPI table can be exposed to the OS to enable the OS to use the local event timer. The method then proceeds to block 210 and disables reporting of the remote event timer to the operating system. For example, the remote event timer can be initialized as a part of a systems management application. As such, reporting of activities of the remote event timer can be disabled to reduce any conflicts or undesirable reporting of redundant errors or adverse operating conditions that may be detected by the remote event timer. The method can then proceed to block 212 and a systems management application operated by a service processor or other type of application can be enabled to access the local event timer. The method can then proceed to block 214 and the method ends.

If at decision block 206, the operating system is not compatible of using a local event timer, the method can proceed to block 216 and use of a remote event timer can be enabled. For example, a remote event timer, or native WDT can be used in association with a service processor. The service processor activates or exposes an event timer or other WDT to the operating system. The method can then proceed to block 218, and a systems management application or other software extensions can employ use of the remote event timer. For example, the systems management application can be initialized and can include one or more agents or processes that report operating conditions that can be used in association with the remote event timer. As such, the remote event timer can be used to monitor activities of the information handling system and operating system and, when a condition exists to reset the information handling system, the remote event timer can initiate a reset of the information handling system.

Upon enabling use of the remote event timer, the method can proceed to block 214 and end. In this manner, an information handling system can use a local event timer, such as a chipset WDT, if an operating system is capable. Additionally, the information handling system can employ a remote event timer, such as a service processor WDT or other native WDT, if an operating system is not capable or the chipset WDT is not available to be used.

Figure 3:
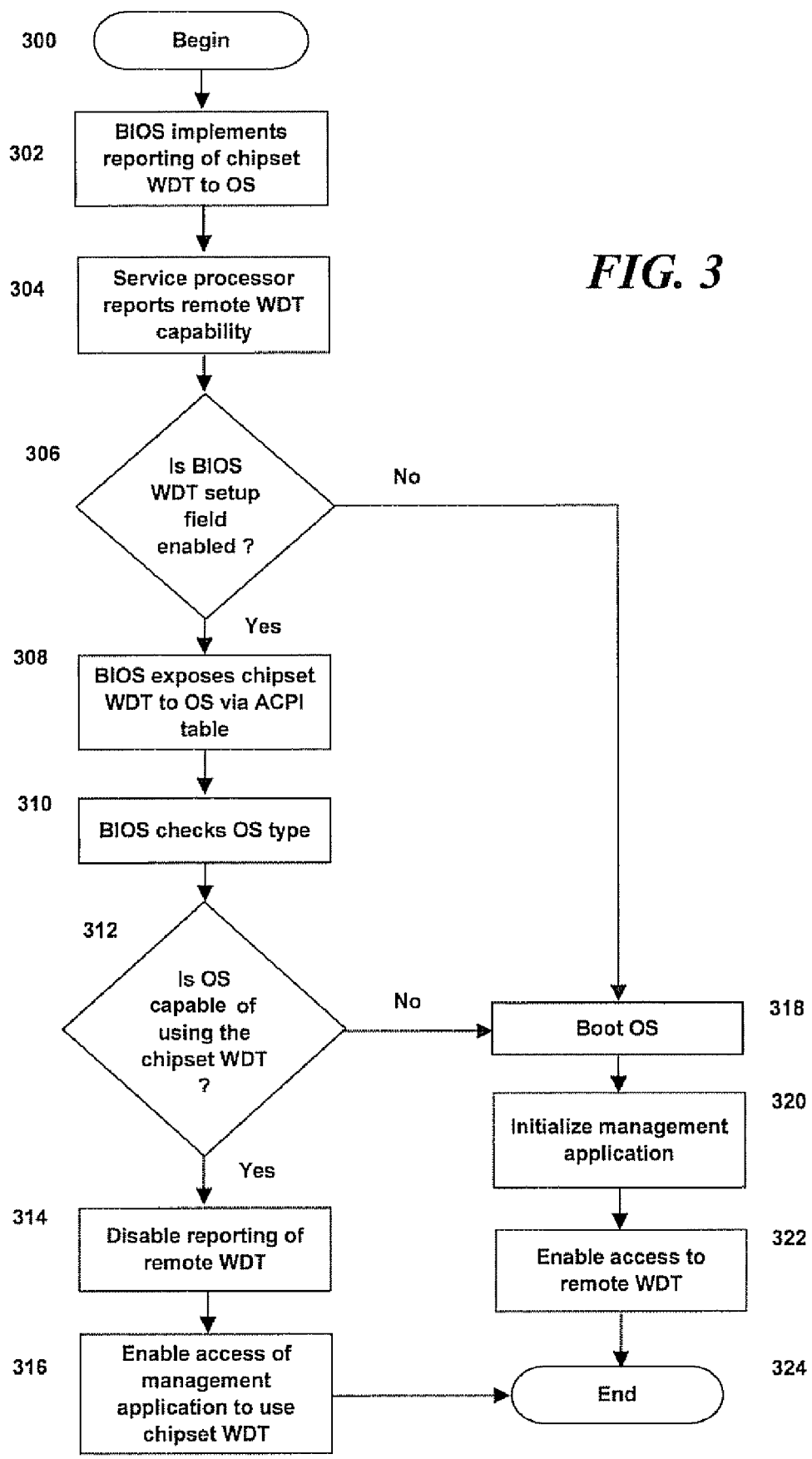
FIG. 3 illustrates an alternate embodiment of a method of enabling an event timer within a multiple event timer operating environment according to another aspect of the disclosure.

FIG. 3 illustrates an alternate embodiment of a method of enabling an event timer within a multiple event timer operating environment according to another aspect of the disclosure. The method of FIG. 3 can be employed in whole, or in part, by the information handling system 100 depicted in FIG. 1, or any other type of system, controller, device, module, application module, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at block 300. At block 302, a BIOS can implement a reporting of a local event timer, such as a chipset WDT, to an operating system during initialization. For example, a BIOS can implement a setup option to enable or disable reporting of a chipset WDT to an operating system. At block 304, a service processor operably associated with an information handling system can report a remote event timer, such as a service processor WDT capability. The method can then proceed to decision block 306, and determines if the WDT setup field within a BIOS initialization setup is enabled. If the WDT setup field is enabled, the method can proceed to block 308, and the BIOS can expose the chipset WDT to the operating system by publishing or communicating the chipset WDT availability via an ACPI table. In one form, the ACPI table can be used in association with a chipset WDT, and exposed to allow an operating system to employ the chipset WDT.

The method can then proceeds to block 310 and the BIOS can check the OS type. For example, the BIOS can detect the type of OS present using an OS bootstrap code that executes using an "_OSI method". An "_OSI method" can include an operating system identifier method or routine used with BIOS or other firmware to identify what operating system is running within and ACPI-enabled operating system. For example, and "_OSI method" is supported within a Microsoft Windows OS and a Linus/SuSE OS. According to one aspect, the OS bootstrap code can employ a portion of a process or kernel that initializes and prepares an OS to execute software applications and programs. Portions of the OS bootstrap code can be used to initialize the WDT. However, in other forms, another portion or sequence of the OS or other extension software can include code to initialize the WDT. For example, the BIOS can detect a chipset WDT enabled OS, such as Windows Vista, Windows Longhorn Server, ACPI enabled Linux, etc. In other embodiments, an OS, such as Windows XP or Windows 2000, may not be capable of using a chipset WDT. In other embodiments, an OS may be a non-ACPI OS. As such, alternate methods of checking an OS may be employed as desired. Upon determining an OS type, the method proceeds to decision block 312 and determines if the OS is capable of using the chipset WDT (e.g. OS is chipset WDT aware). If the OS is capable of employing a chipset WDT, the method can proceed to block 314 and reporting of a remote WDT can be disabled. For example, a remote WDT can be operably associated with a systems management application. As such, the BIOS can communicate a command to a service processor to initiate a firmware or other application, such as an Intelligent Platform Management Interface (IPMI)/Intel Active Management Technology (iAMT) application, to disable and remove reporting of the reporting of a remote WDT presence. In this manner, the remote WDT capabilities can be cleared or disabled and would not allow for reset, power off, or power cycle functionality using the remote WDT. Additionally, by disabling reporting, the set or write commands issued by the systems management application will fail. However, in one form, a systems management application may be able to perform read functions to expose accurate capabilities.

The method can then proceed to block 316 and access of the systems management application to use the chipset WDT can be enabled. For example, the systems management application can be updated to use the chipset WDT. In one embodiment, an the systems management application may employ a routine that includes an operating system logger notification callback routine. For example, the routine can be updated to using periodic monitoring of an operating system log that stores WDT events. The WDT events can be mapped over to initiate one or more legacy or dated automatic system recovery (ASR) events. Upon enabling use of the chipset WDT within the systems management application, the method can proceed to block 324 and end.

At decision block 306 if the BIOS WDT setup field is not enabled, the method can proceed to block 318 and boot the operating system. Similarly, if at decision block 312, the OS is not capable of using the chipset WDT, the method proceeds to block 318 and boots the operating system. The method can then proceed to block 320 and initialize the systems management application and load tools, libraries, etc. of the systems management application. The method can the may proceed to block 322 and access to the remote WDT can be enabled. For example, the systems management application can employ a remote or native WDT that may be operably associated with the systems management application. As such, the operating system loaded by the information handling system can access a remote WDT during use of the information handling system and when an operating condition is detected by the remote WDT, the remote WDT can initiate a reboot or initialize the information handling system as desired. Upon enabling access to the remote WDT, the method can proceed to block 324 and end.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a local event timer operably associated with a management application interface;
   a remote event timer accessible by a system management application, the remote event timer operable to be used relative to use of the local event timer; and
   an event timer detection module operable to:
   determine an availability of the local event timer relative to an operating system type;
   initiate use of the local event timer; and
   disable use of the remote event timer in response to detecting a local event timer enabled operating system.

2. The information handling system of claim 1, further comprising:
   a chipset including the local event timer; and
   a service processor operably associated with the system management application.

3. The information handling system of claim 2, wherein:
   the local event timer includes a chipset watchdog timer operable as a primary event timer; and
   the remote event timer includes a service processor watchdog timer operable as a secondary event timer.

4. The information handling system of claim 2, further comprising a basic input output system (BIOS) configured to initiate access of the local event timer to the operating system, wherein the BIOS is further operable to initiate communication of a command to the service processor to disable the remote event timer.

5. The information handling system of claim 4, further comprising:
   a firmware application accessible by the service processor and responsive to the command to disable reporting of the remote event timer to the service processor; and
   a advanced configuration and power interface (ACPI) table including a local event timer entry operable to be published to the operating system to indicate a local event timer availability.

6. The information handling system of claim 1, wherein the event timer detection module includes a BIOS.

7. The information handling system of claim 1, further comprising a processor operable to:
   access a log table including at least one event timer entry stored in association with the remote event timer;
   map the at least one timing event entry to a system recovery event;
   monitor timing events using the local event timer enabled operating system;
   detect the at least one mapped timing event using the local event timer; and
   activate a system recovery process in response to the at least one mapped timing event.

8. A method comprising:
   exposing a local event timer availability to an operating system using a configurations capabilities reference;
   identifying an operating system type; and
   enabling use of a local event timer in response to determining the operating system type.

9. The method of claim 8, further comprising:
   presenting an advanced configuration and power interface (ACPI) table operably associated with the local event timer, to the operating system;
   comparing the operating system type to at least one entry within the ACPI table; and
   enabling use of the local event timer in response to the operating system type being compatible with the at least one entry.

10. The method of claim 9, further comprising issuing a service processor command to disable use of a service processor event timer in response to enabling use of the local event timer.

11. The method of claim 9, further comprising:
    clearing an event timer registry;
    isolating the ACPI table from the operating system; and
    enabling a local event timer support within the service processor.

12. The method of claim 8, further comprising:
    determining that the operating system type is not capable of using the local event timer;
    booting the operating system; and
    enabling access to a service processor event timer.

13. The method of claim 8, further comprising:
    accessing a log table including at least one event timer entry stored in association with a remote event timer;
    mapping the at least one timing event entry to a system recovery event;
    monitoring timing events using an operating system;
    detecting the at least one mapped timing event using the local event timer; and
    activating a system recovery process in response to detecting the at least one mapped timing event.

14. The method of claim 8, further comprising exposing the local event timer using a BIOS.

15. The method of claim 14, further comprising disabling a remote service processor timer using a service processor command initiated by the BIOS.

16. The method of claim 8, further comprising:
    wherein the enabling includes enabling a chipset watchdog timer; and
    disabling write access to a service processor firmware application operable to enable access to a service processor watchdog timer.

17. A chipset configured to be used by an information handling system, the chipset comprising:
    a local event timer operable to detect an event; and
    an application interface operable to enable access to the local event timer when the operating system type is compatible with the local event timer, the application interface further operable to initiate disabling a remote event timer.

18. The chipset of claim 17, wherein the application interface is configured to disable access to the local event timer in response to the operating system type not being compatible with the local event timer.

19. The chipset of claim 18, wherein the application interface is accessible by an advanced configuration and power interface (ACPI) operable to be used by an operating system of an information handling system.

20. The chipset of claim 17, wherein the application interface is accessible by an information handling system employing a basic input output system (BIOS) operable to determine the operating system is compatible with the local event timer.

* * * * *